United States Patent [19]
McKean et al.

[11] 3,826,940
[45] July 30, 1974

[54] ROTOR CONSTRUCTION FOR SQUIRREL CAGE MOTOR

[75] Inventors: Joseph T. McKean, New Berlin; Norman M. Steinhauer, Milwaukee, both of Wis.

[73] Assignee: Allis-Chalmers Corporation, Milwaukee, Wis.

[22] Filed: Mar. 22, 1973

[21] Appl. No.: 343,795

[52] U.S. Cl. .............................................. 310/211
[51] Int. Cl. ............................................. H02k 3/06
[58] Field of Search ............................ 310/211, 213

[56] References Cited
UNITED STATES PATENTS

| | | | |
|---|---|---|---|
| 529,437 | 11/1894 | Wood | 310/217 X |
| 2,005,201 | 6/1935 | Petersen et al. | 310/211 |
| 2,421,860 | 6/1947 | Winther | 310/211 |
| 2,499,390 | 3/1950 | Joy | 310/211 |

Primary Examiner—D. F. Duggan
Attorney, Agent, or Firm—John P. Hines

[57] ABSTRACT

A squirrel cage rotor for an electric motor which includes slotted laminations and a pair of slotted end connectors at each end of the lamination stack. Conductor bars are contained in each of the slots and extend to the ends of the end connectors which also perform the function of end plates. A continuous annular groove is formed in the surface of the end connector and conductor bars and filled with a continuous weld providing a rigid rotor structure and good electrical contact between the conductor bars and the end connectors.

6 Claims, 4 Drawing Figures

ROTOR CONSTRUCTION FOR SQUIRREL CAGE MOTOR

BACKGROUND OF THE INVENTION

This invention pertains in general to the construction of dynamoelectric machines and particularly, as shown herein for purposes of illustration, to the construction of a rotor for a squirrel cage induction motor.

Squirrel cage rotors ordinarily consist of a stack of magnetically conductive laminations having slots in the periphery of the laminations through which conductor bars extend. The conductor bars are electrically and mechanically joined at either end of the lamination stack.

In one general form of construction the conductor bars and end connectors are cast of an electrically conductive nonmagnetic material about the stack of laminations. Another general form of construction with which this invention is concerned is to provide conductor bars in the lamination slots and an end plate at each end of the stack which mechanically supports the rotor as a unit. Additionally, a short-circuiting ring is employed to provide an electrical connection between each of the conductor bars.

A third general form of construction is shown in U.S. Pat. No. 2,499,390 issued to Henry M. Joy, Mar. 7, 1950. In the Joy patent the conductor bars are connected together by a short-circuiting ring composed of a plurality of laminations having their centers cut out. The conductor bars are welded to the laminations thereby providing a short-circuiting connection.

The subject invention utilizes end plates which act as both an end plate for support and a short-circuiting end connector to provide the electrical connection between the conductor bars. The end connector has substantially the same surface area as the laminations to provide adequate mechanical strength. A continuous annular groove is provided in the end connector and in each of the conductor bars. This groove is filled with a continuous weld to provide a strong mechanical and good electrical connection between the conductor bars and the end connectors.

It is, therefore, the general object of this invention to provide an improved rotor of the squirrel cage induction type wherein the conductor bars are connected to the end connectors by means of a continuous weld provided in a continuous groove formed in the end connector and in the conductor bars.

A further object of the subject invention is to provide a rotor for a squirrel cage induction motor of the hereinbefore described type wherein the continuous groove is provided in the axially facing end surface of the ends of the conductor bars and end connectors.

Another object of the subject invention is to provide a rotor for a squirrel cage induction motor of the hereinbefore described type wherein additional clamping means are provided through the end connectors and the laminations, spaced radially inwardly a substantial distance from the weld connection of the conductor bars.

A more specific object of the subject invention is to provide a rotor for a squirrel cage induction motor of the hereinbefore described type wherein the continuous groove is of a constant depth and width to permit successful automatic deposition of weld material.

These and other objects of the subject invention will become more fully apparent as the following description is read in light of the attached drawing wherein.

Figure 1:
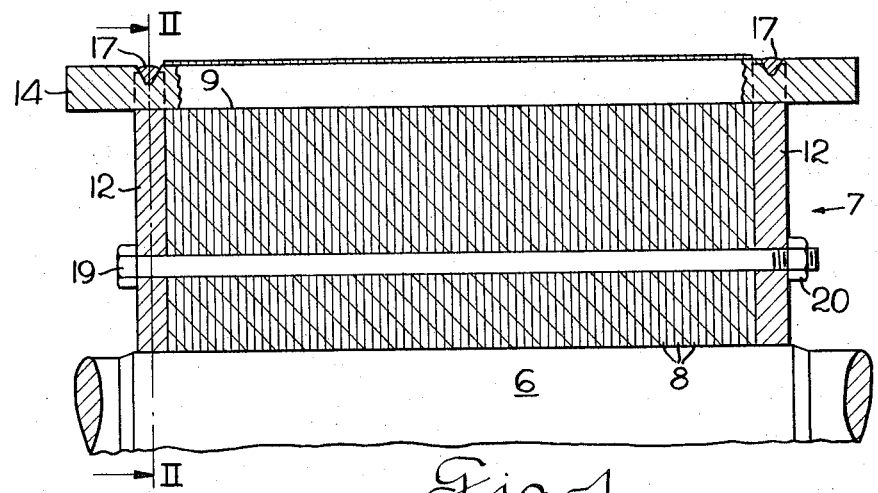
FIG. 1 is a partial sectional view of a squirrel cage induction rotor constructed in accordance with this invention.

Referring to the drawings, 6 represents a shaft on which is mounted a core generally designated 7 composed of a plurality of laminations 8. As is conventional, the laminations are made of a magnetically conductive material and are provided with circumferentially spaced slots 9 in the outer periphery thereof. The slots are aligned so as to present a continuous groove in the periphery of the laminations when they are appropriately stacked on the rotor shaft 6.

An end connector 12 is provided at each end of the stack of laminations. The end connectors provide both an electrical connection and mechanical clamping for the rotor and are therefore substantially equal in surface area to the surface area of the laminations. The end connectors are also provided with grooves 13 in their outer periphery which are equal in number to and are aligned with the grooves in the laminations. The grooves 13 in the end connectors are of uniform cross-section, thus providing a key-like connection between the conductor bars and end connectors.

Figure 2:
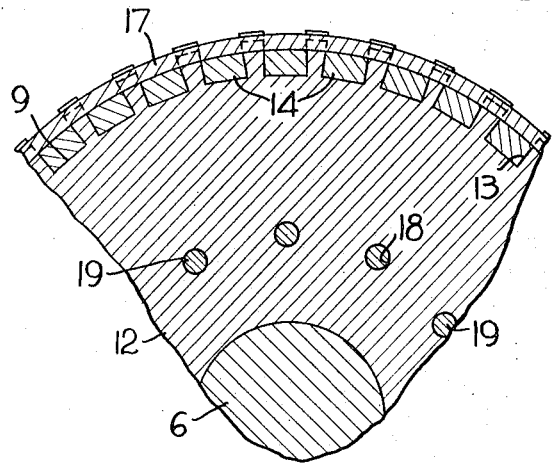
FIG. 2 is a partial cross-sectional view taken along the line II—II of FIG. 1.
Figure 3:
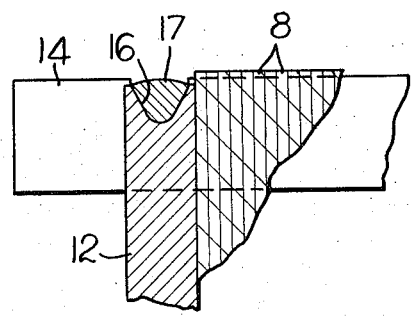
FIG. 3 is an enlarged view showing the weld between the conductor bars and end plates.

Conductor bars 14 are placed in the slots and extend at least to the end surfaces of the end connectors. As herein shown for purposes of illustration, in the modification shown in FIGS. 1 through 3 some of the conductor bars extend beyond the end connectors and act as a fan to assist in cooling the motor.

The conductor bars and end connectors are of a similar material to provide good electrical conductivity but a poor magnetic flux path. The laminations on the other hand are of a different material to provide a good flux path but are insulated to provide a poor path for the flow of electricity.

After the conductor bars, laminations and end connectors are stacked in the proper operative relationship, an annular continuous groove 16 is cut into the outer peripheral surface of the end connectors and each of the conductor bars. The groove 16 has a uniform depth and width to insure a uniform deposition of weld material by an automatic welding machine. This continuous annular groove is then filled with a continuous weld 17 to provide a highly electrically conductive and mechanically strong cross key joint between the conductor bars and end connectors rigidly holding the laminations in place.

To further provide mechanical strength to the rotor core each of the laminations 8 and the end connectors 12 are provided with circumferentially spaced alignable holes 18 therethrough. When stacked these holes are aligned and define an opening completely through the stacked rotor core. An elongated bolt 19 extends through the opening 18. A nut 20 is tightly turned down on the threaded end of the bolt clamping the end connectors against the laminations rigidly holding the core together. Because of the large radial spacing between the bolts 19 and the peripheral weld 17 an extremely rigid and strong core results. As an alternative to the bolts 19 the laminations and end connectors can be shrunk onto the shaft. Such arrangement gives the maximum spacing between the two holding forces.

In view of the machinery presently available and because of its design this rotor is relatively easy to assemble. The laminations 8 and the end connectors 12 are stacked in the operative position. The bolts 19 are then passed through the openings 18 and the nuts 20 turned on the ends of the bolts to rigidly hold the core as a unit. Alternatively the laminations and end connectors can be held in place by external clamps. At this point the groove 16 is machined in the surface of the end connectors and conductor bars. The depth and width of the groove are uniform to insure a uniform weld deposition. After the groove is provided, the weld is placed in the groove by rotating the core relative to an automatic welding head which continuously builds up a weld within the groove until the desired amount of weld has been attained. It would also be possible to use a rotatable welding head to place the weld in the groove.

Figure 4:
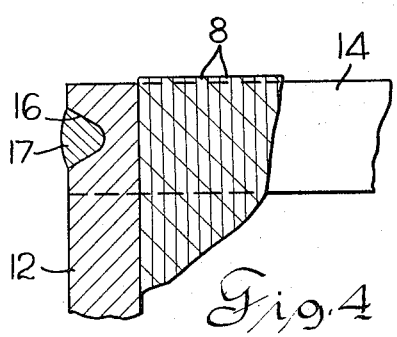
FIG. 4 shows a modified location of the weld and weld groove.

A modification of the invention is shown in FIG. 4 wherein the groove 16 is provided in the axial end surfaces of the rotor bars and end connectors. The weld is then placed in this axially facing groove. In some instances it may be found that this location of the weld groove more readily lends itself to assembly of the rotor.

The embodiments of the invention in which an exclusive property or privilege is claimed are defined as follows:

1. A squirrel cage rotor comprising: a plurality of stacked laminations having aligned circumferentially spaced longitudinally disposed conductor bar slots in the periphery thereof; an end connector having a surface area substantially equal to the surface area of said laminae located on opposite ends of said stack of laminations, said end connectors having conductor bar slots therein aligned with said laminae slots; a longitudinally disposed conductor bar in each of said aligned slots extending at least to the end of said end connectors walls defining; a continuous annular groove in the adjacent surfaces of said conductor bars and end connectors; and a continuous weld in said groove to hold said rotor together as a unit and provide good electrical and mechanical contact between said conductor bars and said end connectors.

2. The squirrel cage rotor set forth in claim 1 wherein said groove is of uniform depth and width.

3. The squirrel cage rotor set forth in claim 1 wherein said continuous annular groove is formed in the end surface of said conductor bars and the intervening surfaces of said end connectors.

4. The squirrel cage rotor set forth in claim 1 and further comprising means located adjacent said shaft engaging said end connectors to rigidly hold said laminations and end connectors against relative movement.

5. The squirrel cage rotor set forth in claim 1 wherein said conductor bars and end connectors are constructed of material having similar electrical and magnetic characteristics and said laminations are constructed of a material having dissimilar magnetic and electrical characteristics from the magnetic and electrical characteristics of said conductor bars and said end connectors.

6. The squirrel cage rotor set forth in claim 1 wherein a plurality of said conductor bars extend beyond said end connectors to provide fan blades for cooling the rotor.

* * * * *

PO-1050
(5/69)

UNITED STATES PATENT OFFICE
CERTIFICATE OF CORRECTION

Patent No. 3,826,940          Dated  July 30, 1974

Inventor(s) Joseph T. McKean and Norman M. Steinhauer

It is certified that error appears in the above-identified patent and that said Letters Patent are hereby corrected as shown below:

Column 4, lines 6-7, "connectors walls defining; a" should read --- connectors; walls defining a ---.

Signed and sealed this 15th day of October 1974.

(SEAL)
Attest:

McCOY M. GIBSON JR.
Attesting Officer

C. MARSHALL DANN
Commissioner of Patents